United States Patent [19]

Yagi et al.

[11] Patent Number: 4,888,792

[45] Date of Patent: Dec. 19, 1989

[54] MULTI-LEVEL QUADRATURE AMPLITUDE MODULATION AND DEMODULATION SYSTEM

[75] Inventors: Takeshi Yagi, Otawara; Kenzo Kobayashi, Sendai, both of Japan

[73] Assignee: Fujitsu Limited, Kawasaki, Japan

[21] Appl. No.: 231,487

[22] Filed: Aug. 12, 1988

[30] Foreign Application Priority Data

Aug. 27, 1987 [JP] Japan .................................. 62-213286

[51] Int. Cl.⁴ .............................................. H04L 5/12
[52] U.S. Cl. ...................................... 375/39; 332/103; 329/304
[58] Field of Search ...................... 375/39, 17, 20, 116, 375/115; 329/50; 380/36, 37; 370/107; 332/31 R

[56] References Cited

U.S. PATENT DOCUMENTS

| | | | |
|---|---|---|---|
| 4,285,062 | 8/1981 | Yoshida et al. | 375/39 |
| 4,494,239 | 1/1985 | Martin | 375/39 |
| 4,665,532 | 5/1987 | Fukuda et al. | 375/39 |
| 4,721,928 | 1/1988 | Yoshida | 375/39 |

Primary Examiner—Robert L. Griffin
Assistant Examiner—Marianne Huseman
Attorney, Agent, or Firm—Staas & Halsey

[57] ABSTRACT

A multi-level quadrature amplitude modulation and demodulation system includes a first exchange circuit for cyclicly exchanging input digital signals and for outputting exchanged signals to D/A converters. The D/A converters provide analog signals to a QAM modulator which produces a modulated signal. In the receiver side of the system, a QAM demodulator demodulates the modulated signal to produce analog signals which are converted to digital exchanged signals by A/D converters. The digital exchanged signals are exchanged in a manner which is the reverse of that of the first exchange circuit to provide output digital signals on output terminals which respectively correspond to the input terminals. By cyclicly exchanging the input signals in this manner, the transmission quality for each of the input signal channels is maintained equal.

9 Claims, 3 Drawing Sheets

MULTI-LEVEL QUADRATURE AMPLITUDE MODULATION AND DEMODULATION SYSTEM

BACKGROUND OF THE INVENTION

1. Field of the Invention

The present invention relates to a multi-level quadrature amplitude modulation and demodulation system utilizing a D/A converter and an A/D converter.

2. Description of the Related Art

FIGS. 1A and 1B form a block diagram of a prior art modulation and demodulation system (64-level, in this example). FIG. 1A illustrates a transmitter having input terminals for receiving six 2-level binary input digital signals (i.e., data for each channel) D1IN-D6IN which are rearranged into two sets of signals, D1IN-D3IN and D4IN-D6IN. Each set includes three signals which are input to a corresponding one of digital/analog (D/A) converters 10a and 10b, in which the sets of signals are converted to 8-level amplitude modulated signals A1 and A2. The 8-level amplitude modulated signals A1 and A2 are supplied to a quadrature amplitude modulator 12 which provides a 64-level quadrature amplitude modulated signal over a transmission link by modulating the carrier after any necessary band-limitation.

FIG. 1B illustrates a receiver which is coupled to the QAM modulator 12 via the transmission link, and in which an input signal (i.e., the modulated signal) is input to a quadrature amplitude demodulator 14, and demodulated with a recovered carrier generated by a carrier recovery circuit (not shown). Demodulated outputs B1 and B2 are input to analog/digital (A/D) converters 16a and 16b, respectively, and a recovered clock CLK which is regenerated by the clock recovery circuit (not shown), is input to the A/D converters 16a and 16b. As a result, digital signals D1OUT-D6OUT are clocked out at output terminals as outputs of the A/D converters 16a and 16b in accordance with the clock.

The D/A converters 10a and 10b provide 3-bit binary numbers by extracting one bit from the three binary digital signals which are input, and convert such binary numbers to the analog signals A1 and A2 through D/A conversion. Each bit of the binary input digital signals D1IN-D3IN is processed as follows. D1IN is processed as the most significant bit of the 3-bit binary number, D2IN as the intermediate bit, and D3IN as the least significant bit. Therefore, the following table can be obtained for D/A conversion output A1.

TABLE 1

| D1IN | D2IN | D3IN | A1 |
|------|------|------|----|
| 1 | 1 | 1 | 7 |
| 1 | 1 | 0 | 6 |
| 1 | 0 | 1 | 5 |
| 1 | 0 | 0 | 4 |
| 0 | 1 | 1 | 3 |
| 0 | 1 | 0 | 2 |
| 0 | 0 | 1 | 1 |
| 0 | 0 | 0 | 0 |

The processing explained above is also applied to the digital binary input signals D4IN-D6IN. The signals D1IN-D6IN are serial data supplied from terminals or channels (referred to herein only as channels) 1-6 (not illustrated). The channels are sequentially processed in accordance with the conversion explained above.

The multi-level quadrature amplitude modulation and demodulation system of the prior art has a problem in that an error rate due to distortion of the modulated signal, or noise on the modulated signal, results in differences between the paths D1OUT-D6OUT. As is apparent from Table 1, D1IN, D4IN are processed as the third digit of the 3-bit binary signal (i.e., a digit of "4"); D2IN, D5IN as the second digit (i.e., a digit of "2") and D3IN, D6IN as the first digit (i.e., a digit of "1"). Therefore, after conversion to an analog signal, D1IN, D4IN have an amplitude equal to 2 times that of D2IN, D5IN or 4 times that of D3IN, D6IN. Similarly, D2IN, D5IN have an amplitude equal to 2 times that of D3IN, D6IN. In the case of this system, the inputs D1IN, D4IN have the best path, inputs D2IN, D5IN have the second best path and inputs D3IN, D6IN have the worst path.

SUMMARY OF THE INVENTION

It is an object of the present invention to improve the characteristics of the prior art system to assure paths having equal transmission quality for any input.

In the present invention, a frame pulse inserting circuit and a selector, for example, are provided, as a means for periodically exchanging the data of each channel, in the front of the D/A converter in the transmitter side. A frame synchronizing circuit and a selector, for example, are provided, as a means for exchanging data of each channel in a manner opposite to the transmitter side, after the A/D converter of the receiver side. In the transmitter side, the inserting circuit inserts a frame pulse into the data of each channel and the selector cyclicly alters assignment in the frame data unit. Meanwhile, in the receiver side, the frame synchronizing circuit obtains frame synchronizing signals, and operates the selector to return the A/D conversion output to data of each channel.

According to the present invention, since data of each channel is sequentially exchanged and is caused to pass through all paths, all channels have the same transmission quality.

These together with other objects and advantages, which will become subsequently apparent, reside in the details of construction and operation as more fully hereinafter described and claimed, reference being had to the accompanying drawings, forming a part hereof, wherein like numerals refer to like parts throughout.

DESCRIPTION OF THE PREFERRED EMBODIMENT

Figure 1A:
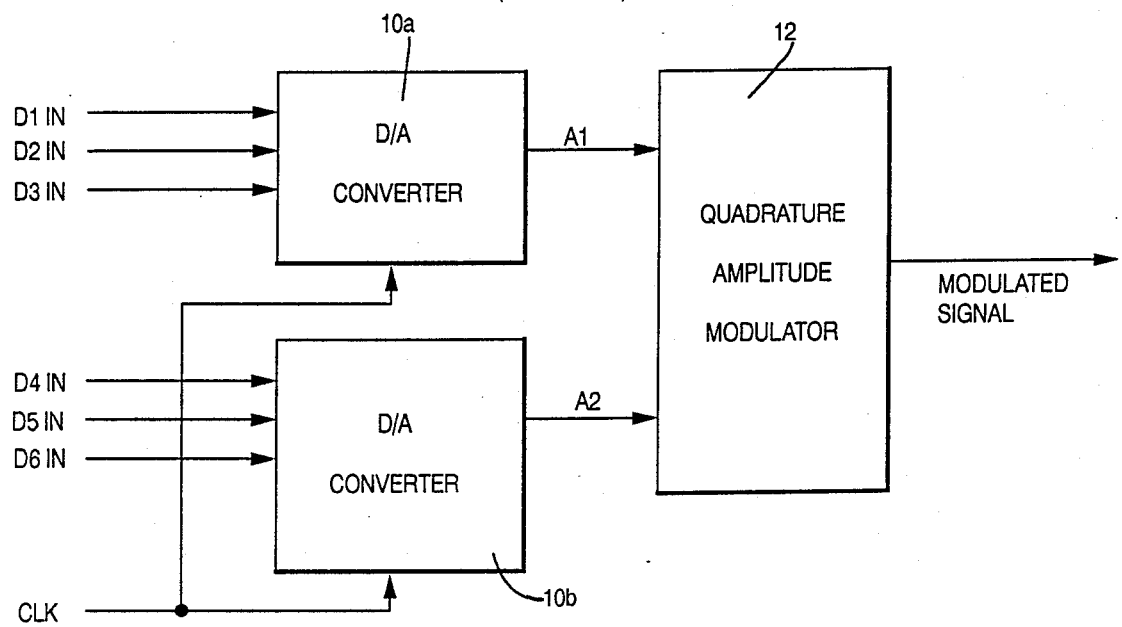
FIG. 1A is a block diagram of a transmitter of a prior art QAM system.
Figure 1B:
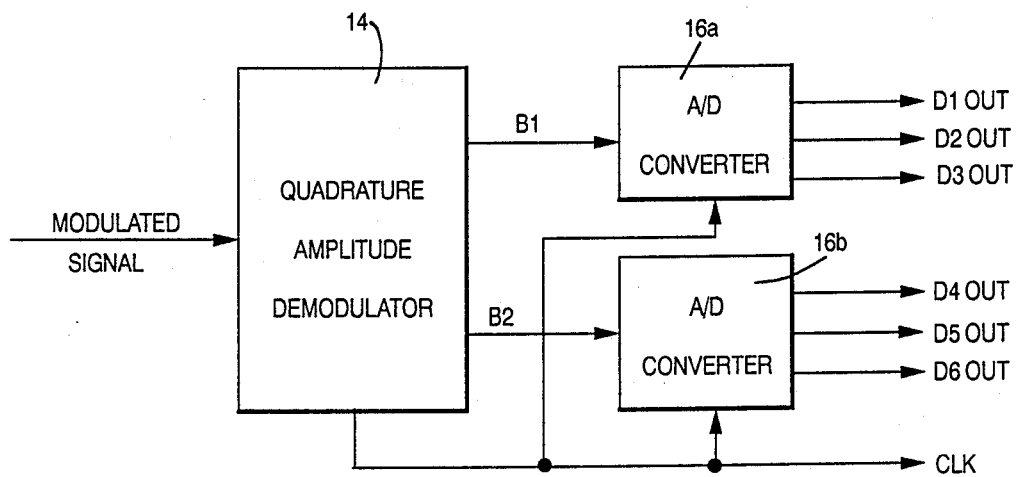
FIG. 1B is a block diagram of a receiver of a prior art QAM system.
Figure 2A:
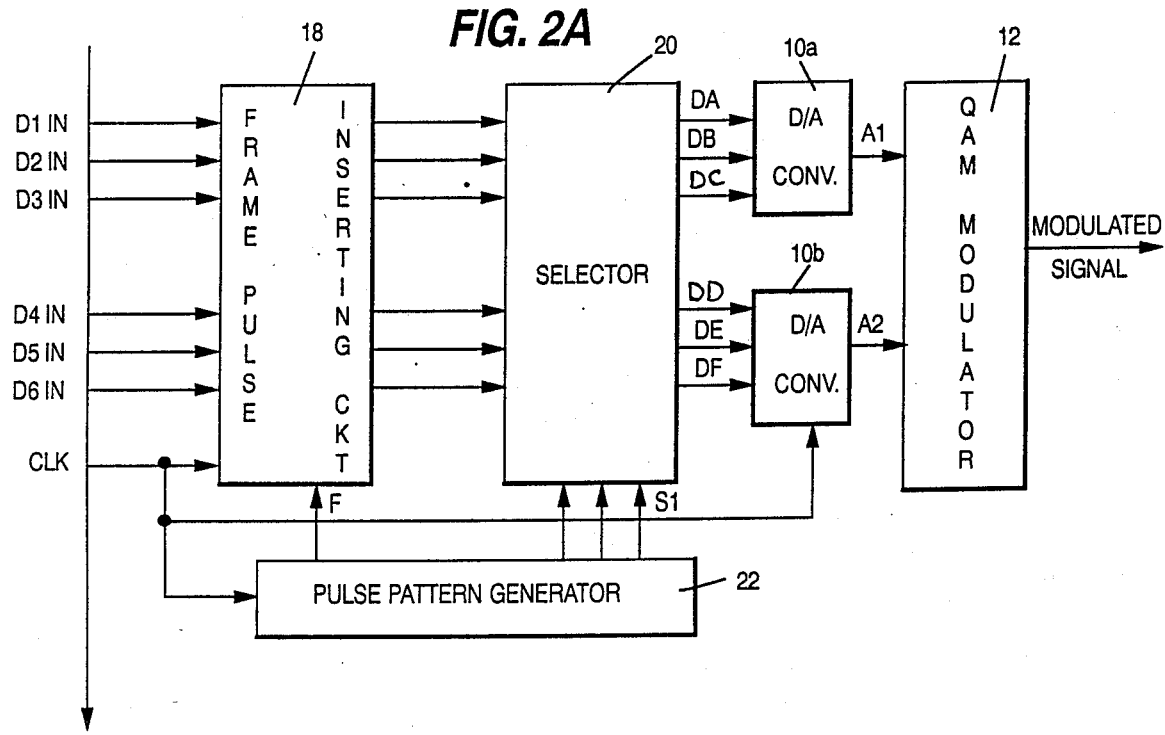
FIG. 2A is a block diagram of a transmitter in accordance with an embodiment of the present invention.
Figure 2B:
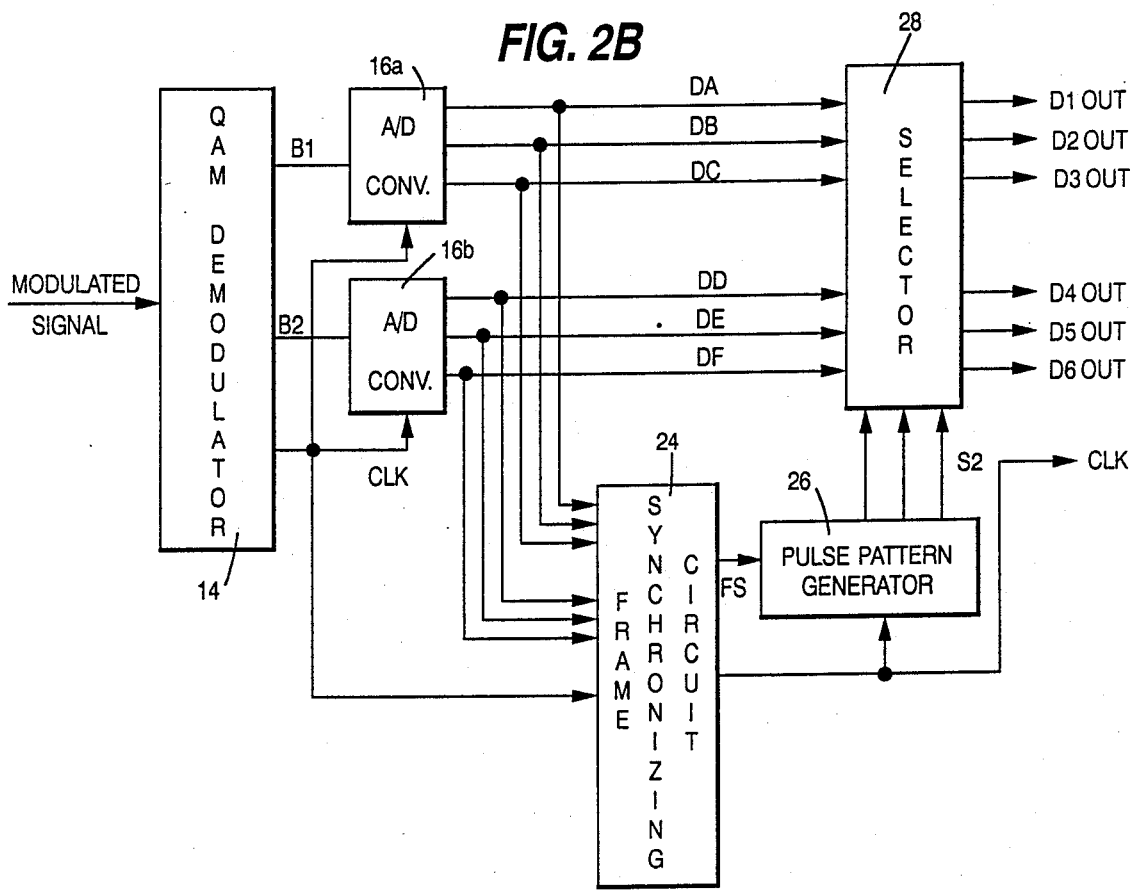
FIG. 2B is a block diagram of a receiver in accordance with an embodiment of the present invention.

FIGS. 2A and 2B are block diagrams which form an embodiment of a multi-level quadrature amplitude modulation and demodulation system in accordance with the present invention. FIG. 2A is a block diagram of the modulation system and FIG. 2B is a block diagram of the demodulation system. As is apparent from comparison with FIGS. 1A and 1B, in the present invention a frame pulse inserting circuit 18, a selector 20 and a pulse pattern generator 22 are provided in the modulation system, while a frame synchronizing circuit 24, a pulse pattern generator 26 and a selector 28 are provided in the demodulating system.

As illustrated in FIG. 2A, in the modulation system side, a frame pulse F which is generated by counting the clock CLK in the pulse pattern generator 22, is inserted into the input digital signals D1IN-D6IN by the frame pulse inserting circuit 18. As a result, the inputs D1IN-D6IN are sequentially exchanged by the selector 20 in accordance with a selector control signal S1 output by the pulse pattern generator 22. The data DA-DF indicated in the following Table are obtained as outputs of the selector 20.

TABLE 2

| OUTPUT | CONTENTS |
|---|---|
| DA | F D1IN F D2IN F D3IN F D4IN F D5IN F D6IN F D1IN ... |
| DB | F D2IN F D3IN F D4IN F D5IN F D6IN F D1IN F D2IN ... |
| DC | F D3IN F D4IN F D5IN F D6IN F D1IN F D2IN F D3IN ... |
| DD | F D4IN F D5IN F D6IN F D1IN F D2IN F D3IN F D4IN ... |
| DE | F D5IN F D6IN F D1IN F D2IN F D3IN F D4IN F D5IN ... |
| DF | F D6IN F D1IN F D2IN F D3IN F D4IN F D5IN F D6IN ... |

Figure 3:
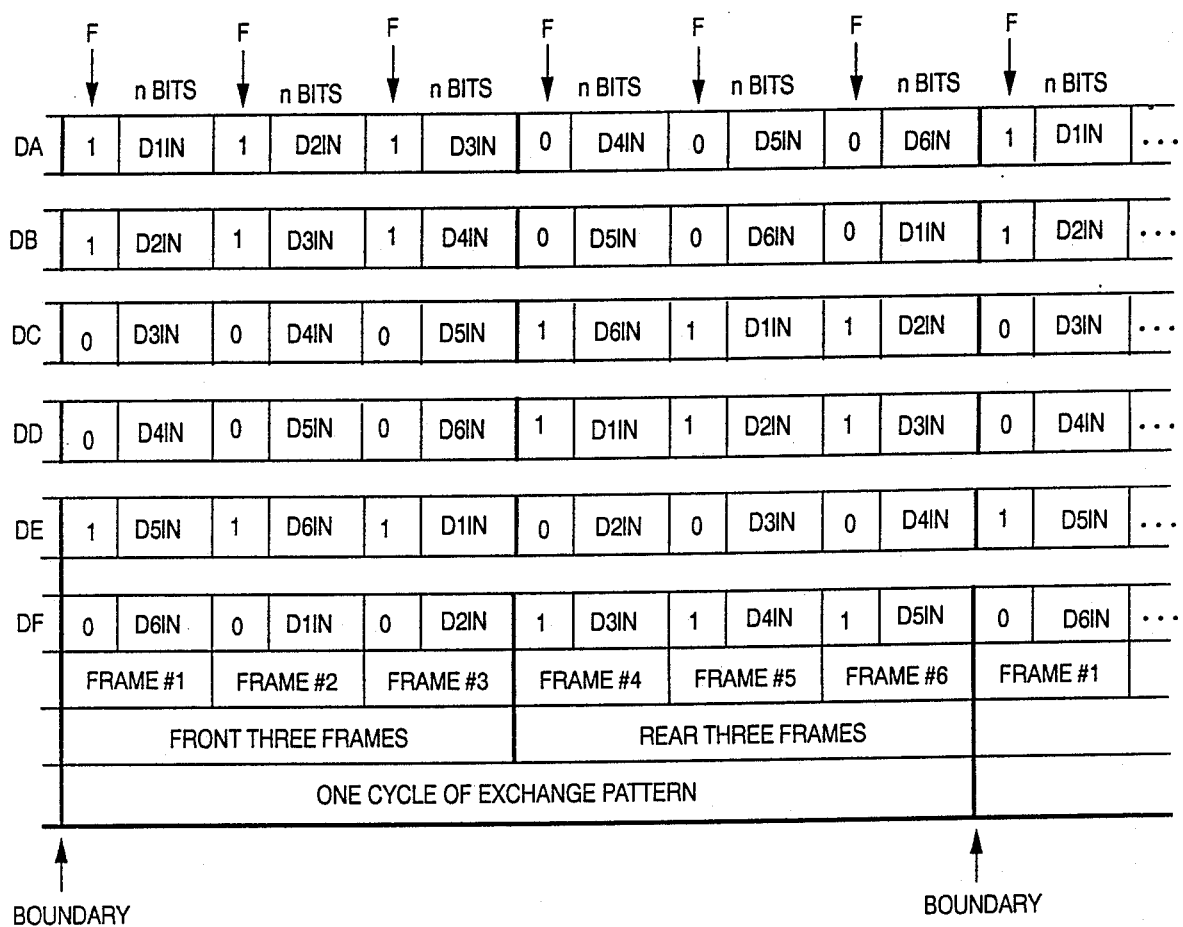
FIG. 3 is a chart for illustrating the frame pulse pattern for one cycle of an exchange pattern in accordance with the present invention.

Namely, the six inputs D1IN-D6IN respectively appear sequentially and cyclicly at the six outputs of the selector 20. As illustrated in FIG. 3, the front three frames (frame #1-frame #3) have a frame pulse pattern indicated by 110010 at the head of each frame in one cycle of exchange pattern. The rear three frames (frame #4-frame #6) have a frame pulse pattern indicated by 001101 (i.e , the inverse of the frame pulse pattern for the front three frames). Of course, other frame pulse patterns may be used, as long as the cycle of the pulse pattern is equal to that of the exchange pattern. Therefore, if the frame pulse pattern is repeated three times and its inverse is thereafter repeated three times, the boundary of one cycle of exchange pattern for D1-D6 can be indicated and is effective for synchronous detection. If a number of bits of data D1, D2, . . . occur between frame pulses F, then path exchange can be carried out with respect to a unit of n bits.

The outputs DA-DC, DD-DF of the selector 20 are input to the D/A converters 10a and 10b, and the 8-level converted outputs A1 and A2 are input to the quadrature amplitude modulator 12 which provides the 64-level quadrature amplitude modulated signal.

In the receiving side, the modulated signal is received and is then input to the quadrature amplitude demodulator 14. The demodulated outputs B1 and B2 of the quadrature amplitude demodulator 14 are A/D converted by the A/D converters 16a and 16b, respectively. The A/D converter outputs DA-DF are then input to the selector 28 and also to the frame synchronizing circuit 24 for synchronous detection of the frame pulse pattern. In the receiver, the boundary of one cycle of the exchange pattern must be detected in order to realize the correct exchange pattern for the outputs DA-DF. The frame pulse pattern (110010) (110010) (110010) (001101) (001101) (001101) corresponds to the exchange pattern. Therefore, the exchange in the receiver is synchronized to that of the transmitter by detecting the frame pulse pattern. The pulse pattern generator 26 obtains a frame synchronizing signal FS and clock CLK from the frame synchronizing circuit 24, and provides a signal S2 to operate the selector 28. The signal S2 corresponds to the selector control signal S1 in the transmitter side, and each data signal is returned to the initial state by an exchange operation which is the reverse of that conducted in the transmitter side. As a result, the outputs D1OUT-D6OUT of the selector 28 in the receiver side respectively correspond to the inputs D1IN-D6IN in the transmitter side. That is, the path exchange is reversed so that the outputs D1OUT-D6OUT correspond to the inputs D1IN-D6IN. For example, the signal corresponding to D1IN always appears at D1OUT and never appears at D2OUT. Moreover, in the transmitting and receiving systems of the present invention, the inputs D1IN-D6IN are sequentially passed through all six paths of the transmitting and receiving systems, thereby realizing equalization of transmission quality.

The selector 20 has six unit selecting functions corresponding to the six outputs DA-DF. In each unit selecting function, one of six input signals D1-D6 is selected depending on the selector control signal S1 as shown in the following Table.

TABLE 3

| S1 | DA | DB | DC | DD | DE | DF |
|---|---|---|---|---|---|---|
| 000 | D1 | D2 | D3 | D4 | D5 | D6 |
| 001 | D2 | D3 | D4 | D5 | D6 | D1 |
| 010 | D3 | D4 | D5 | D6 | D1 | D2 |
| 011 | D4 | D5 | D6 | D1 | D2 | D3 |
| 100 | D5 | D6 | D1 | D2 | D3 | D4 |
| 101 | D6 | D1 | D2 | D3 | D4 | D5 |

The selector 28 is similar to the selector 20. In the embodiment explained above, the exchange in the transmitting selector 20 and the receiving selector 28 is synchronized using frame synchronization, but the present invention is not limited thereto. It is of course possible to employ a system wherein the signal which indicates synchronization is transmitted in parallel with the data. Moreover, in the above embodiment, exchange is carried out by sequentially circulating the data D1-D6, but the data D1-D3 and D4-D6 may be arranged in different groups and circulated within each group. In addition, in the embodiment explained above, a 64-level QAM is used, but other QAM, such as 16-level QAM or 256-level QAM, can also be The many features and advantages of the invention are apparent from the detailed specification and thus it is intended by the appended claims to cover all such features and advantages of the system which fall within the true spirit and scope of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A multi-level quadrature amplitude modulation and demodulation system, comprising:

a transmitter having a modulator and input terminals for receiving input digital signals, said transmitter including:

first exchange means, coupled to the input terminals, for cyclicly exchanging the order of the input digital signals and outputting first exchanged signals; and D/A converters, coupled to said first exchange means and said modulator, for receiving the first exchanged signals and outputting analog signals to said modulator;

a receiver having a demodulator and output terminals, said receiver including:

A/D converters, coupled to said demodulator to receive the analog signals, for converting the analog signals to second exchanged signals; and second exchange means, coupled to said A/D converters and the output terminals, for exchanging the second exchanged signals in a manner which is reversed with respect to said first exchange means, and for providing output digital signals respectively corresponding to the input digital signals.

2. A multi-level quadrature amplitude modulation and demodulation system as set forth in claim 1, wherein said first exchange means comprises:

a first pulse pattern generator for generating frame pulses and a first selector control signal by counting a clock signal;

a frame pulse inserting circuit, coupled to the input terminals and said first pulse pattern generator, for inserting the frame pulses into the input digital signals periodically; and a first selector, coupled to said frame pulse inserting circuit, said pulse pattern generator and said D/A converters, for exchanging the input digital signals from said frame pulse inserting circuit in dependence upon the first selector control signal, and for providing the first exchanged signals to said D/A converters.

3. A multi-level quadrature amplitude modulation and demodulation system as set forth in claim 2, wherein said second exchange means comprises:

a frame synchronizing circuit, coupled to said A/D converters, for establishing synchronization with said first exchange means by detecting the frame pulses inserted in the exchanged signals, and for outputting frame synchronization pulses and a clock signal;

a second pulse pattern generator, coupled to said frame synchronizing circuit, for receiving the frame synchronization pulses and the clock signal from said frame synchronizing circuit, and for outputting a second selector control signal synchronously with the first selector control signal based on the frame synchronization pulses; and a second selector, coupled to said A/D converters and said second pulse pattern generator, for exchanging the second exchanged signals from said A/D converters in a manner which is reversed with respect to said first selector, and for providing the output digital signals respectively corresponding to the input digital signals.

4. A multi-level quadrature amplitude modulation and demodulation system coupled to input terminals and output terminals, comprising:

first exchange means, coupled to the input terminals, for cyclicly exchanging the order of the input digital signals and for outputting first exchanged signals;

D/A conversion means, coupled to said first exchange means, for converting the first exchanged signals into analog signals;

a QAM modulator, coupled to said D/A conversion means, for generating a modulated signal;

a QAM demodulator, coupled to said QAM modulator, for converting the modulated signal to the analog signals;

A/D conversion means, coupled to said QAM demodulator, for converting the analog signals into second exchanged signals; and second exchange means, coupled to said A/D conversion means to and to the output terminals, for exchanging the second exchanged signals in a manner which is reversed with respect to said first exchange means, and for outputting output digital signals, respectively corresponding to the input digital signals, on the output terminals.

5. A multi-level quadrature amplitude modulation and demodulation system as set forth in claim 4, wherein said first exchange means comprises:

a first pulse pattern generator for generating frame pulses and a first selector control signal by counting a clock signal;

a frame pulse inserting circuit, coupled to the input terminals and to said first pulse pattern generator, for inserting the frame pulses into the input digital signals periodically; and a first selector, coupled to said frame pulse inserting circuit, said pulse pattern generator and said D/A conversion means, for exchanging the input digital signals from said frame pulse inserting circuit in dependence upon the first selector control signal, and for providing the first exchanged signals to said D/A conversion means.

6. A multi-level quadrature amplitude modulation and demodulation system as set forth in claim 5, wherein said second exchange means comprises:

a frame synchronizing circuit, coupled to said A/D conversion means, for establishing synchronization with said first exchange means by detecting the frame pulses inserted in the exchanged signals, and for outputting frame (synchronization pulses and a clock signal;

a second pulse pattern generator, coupled to said frame synchronizing circuit, for receiving the frame synchronization pulses and the clock signal from said frame synchronizing circuit, and for outputting a second selector control signal synchronously with the first selector control signal based on the frame synchronization pulses; and a second selector, coupled to said A/D conversion means and said second pulse pattern generator, for exchanging the second exchanged digital signals from said A/D conversion means in a manner which is reversed with respect to said first selector, and for providing the output digital signals respectively corresponding to the input digital signals.

7. A multi-level amplitude modulation and demodulation system coupled to input terminals and output terminals, and including a modulator and a demodulator which are coupled by a transmission link, comprising:

first exchange means, coupled to the input terminals, for cyclicly exchanging the order of the input digital signals and for outputting first exchanged signals;

D/A conversion means, coupled to said first exchange means, for converting the first exchanged signals into analog signals and for providing the analog signals to the modulator;

A/D conversion means, coupled to the demodulator, for converting the analog signals into second exchanged signals; and second exchange means, coupled to said A/D conversion means and to the output terminals, for exchanging the second exchanged signals in a manner which is reversed with respect to said first exchange means and for outputting output digital signals, respectively corresponding to the input digital signals, on the output terminals.

8. A multi-level quadrature amplitude modulation and demodulation system as set forth in claim 7, wherein said first exchange means comprises:

a first pulse pattern generator for generating frame pulses and a first selector control signal by counting a clock signal;

a frame pulse inserting circuit, coupled to the input terminals and to said first pulse pattern generator, for inserting the frame pulses into the input digital signals periodically; and a first selector coupled to said frame pulse inserting circuit, said first pulse pattern generator and said D/A conversion means, for exchanging the input digital signals from said frame pulse inserting circuit in dependence upon the first selector control signal, and for providing the first exchanged signals to said D/A conversion means.

9. A multi-level quadrature amplitude modulation and demodulation system as set forth in claim 8, wherein said second exchange means comprises:

a frame synchronizing circuit, coupled to said A/D conversion means, for establishing synchronization with said first exchange means by detecting the frame pulses inserted in the exchanged signals, and for outputting frame synchronization pulses and a clock signal;

a second pulse pattern generator, coupled to said frame synchronizing circuit, for receiving the frame synchronization pulses and the clock signal from said frame synchronizing circuit, and for outputting a second selector control signal synchronously with the first selector control signal based on the frame synchronization pulses; and a second selector, coupled to said A/D conversion means and said second pulse pattern generator, for exchanging the second exchanged signals from said A/D conversion means in a manner which is reversed with respect to said first selector, and for providing the output digital signals respectively corresponding to the input digital signals.

* * * * *

UNITED STATES PATENT AND TRADEMARK OFFICE
CERTIFICATE OF CORRECTION

PATENT NO. : 4,888,792

DATED : DECEMBER 19, 1989

INVENTOR(S) : TAKESHI YAGI ET AL.

It is certified that error appears in the above-identified patent and that said Letters Patent is hereby corrected as shown below:

Col. 4, line 54, after "be" insert --employed.--.

Col. 6, line 15, delete "to" (first occurrence);

line 45, delete "(--.

Signed and Sealed this

Twenty-ninth Day of October, 1991

*Attest:*

HARRY F. MANBECK, JR.

*Attesting Officer*     *Commissioner of Patents and Trademarks*